United States Patent
Berets

[11] 3,879,108
[45] Apr. 22, 1975

[54] ELECTROCHROMIC DEVICES

[75] Inventor: Donald Joseph Berets, Stamford, Conn.

[73] Assignee: American Cyanamid Company, Stamford, Conn.

[22] Filed: May 18, 1973

[21] Appl. No.: 361,760

Related U.S. Application Data

[63] Continuation of Ser. No. 211,857, Dec. 23, 1971, abandoned, which is a continuation of Ser. No. 41,153, May 25, 1970, abandoned.

[52] U.S. Cl. .............................. 350/160 R
[51] Int. Cl. ................................ G02f 1/36
[58] Field of Search ......................... 350/160

[56] References Cited
UNITED STATES PATENTS
3,704,057  11/1972  Beegle .................. 350/160

Primary Examiner—William L. Sikes
Attorney, Agent, or Firm—Charles J. Fickey

[57] ABSTRACT

An electro-optical device useful in data display and imaging device typically comprising in sandwiched arrangement a pair of electrodes between which are disposed two similar electrochromic layers separated by a semi-solid conductive medium. The device exhibits superior electrochromic reversibility and greatly improved cell life over prolonged coloration and bleaching cycles.

9 Claims, 4 Drawing Figures

INVENTOR.
DONALD JOSEPH BERETS

INVENTOR.
DONALD JOSEPH BERETS
BY
Charles J. Fickey
ATTORNEY

ELECTROCHROMIC DEVICES

This is a continuation, of application Ser. No. 211,857 filed Dec. 23, 1971, now abandoned, which was a continuation of application Ser. No. 41,153, filed May 25, 1970 and now abandoned.

BACKGROUND OF INVENTION

This invention relates to electro-optical devices whose electromagnetic radiation characteristics can be selectively altered by influence of a suitably controlled electric field. More particularly the invention is concerned with an electro-optical device which contains a layer of electrochromic material, where an electrochromic serves as its own counter electrode. Still more particularly this invention is directed to a sandwich type cell in which two layers of electrochromic material are separated by a semi-solid conducting media such as a conducting grease or gel.

In prior U.S. application, Ser. No. 530,086 filed Feb. 25, 1966 and Ser. No. 534,188 filed Mar. 14, 1966 and continuation-in-part applications thereof, there are described electro-optical devices exhibiting a phenomenon known as persistent electrochromism wherein electromagnetic radiation absorption characteristic of a material is altered under the influence of an electric field. Such devices were employed in sandwich arrangement between two electrodes. Coloration was induced by charging the electrochromic film negative employing an external potential.

By reversing the original polarity of the field or by applying a new field, it was also possible to cancel, erase or bleach the visible coloration.

These steps of color induction and erasure are defined as cycling.

Although the devices described in the prior applications are effective to change their electromagnetic radiation transmitting properties under the influence of an electric field, the simple sandwiched or layered arrangement of electrodes and layer of electrochromic material is somewhat limited in application because of imperfect electrode reversibility, i.e., the difficulty in returning the device to its initial state without inducing irreversible electrochemical changes. This difficulty resulted in part from the different voltage, time and conductivity requirements for the coloration and bleaching reaction and aggregate degradative side reactions arising from the use of dissimilar electrode materials.

This shortcoming has been overcome in the present invention by employing a compatible system wherein an electrochromic material acts as its own counter electrode thus obviating undesirable electrochemical side reactions.

SUMMARY OF INVENTION

An object of the present invention is therefore to provide an improved form of electrochromic device wherein the electrochromic material is used as its own counter electrode thereby providing improved electrode reversibility and longer useful life.

Briefly stated the present invention modifies the prior electrode-electrochromic material sandwich by employing two layers of electrochromic material instead of one, the additional electrochromic layer being a material identical to the material of the first layer and serving as its own counter electrode. The conducting medium between and in contact with both electrochromic layers is a semi solid conducting media. It has been found that when a second electrochromic layer of the same material is added to the device described in the prior applications not only does it permit greater intrinsic electrode reversibility but it also renders electrodes closely compatible to each other, thus permitting the cell to undergo reversible oxidation and reduction reactions without long term deterioration thereby improving the cells' ultimate life.

The longer cell life thus achieved in contrast to the embodiments of the earlier applications permits commercial applications wherein stringent cell stability and life requirements are imposed. Thus the invention is applicable to mirrors, windows and data display devices for use in protracted service. The field of practical use in widened, moreover, by the use of a semi-solid conducting media permitting ease of assembly and minimizing the possibility of premature failure from electrolyte leakage and evaporation.

The foregoing and other features, objects and advantages of the present invention will become more apparent from the following detailed description.

DETAILED DESCRIPTION OF INVENTION

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Koldysh effect.

ELECTROCHROMIC MATERIALS

The materials which form the electrochromic materials of the device in general are electrical insulators or semiconductors. Thus are excluded those metals, metal alloys, and other metal-containing compounds which are relatively good electrical conductors.

While not wholly understood, it appears that the materials contain in non-stoichiometric porportions at least two different elements, said elements being present as ions of opposite polarity. This condition produces lattice defects as distinguished from mere physical displacement of crystal symmetry, although the condition may also result in or be evidenced by such. Lattice vacancies are particular instances of lattice defects as, for example, an oxygen vacancy in a metal oxide crystal.

The persistent electrochromic materials are further characterized as inorganic substances which are solid under the conditions of use, whether as pure elements, alloys, or chemical compounds, containing at least one element or variable oxidation state, that is, at least one element of the Periodic System which can exist in more than one oxidation state in addition to zero. The term "oxidation state" as employed herein is defined in "Inorganic Chemistry," T. Moeller, John Wiley & Sons, Inc., New York, 1952.

These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, toatalates, titanates, stannates, and the like. Particularly preferred are films of metal stannates, oxides and sulfide of the metals of Groups (IV)B, (V)B and (VI)B of the Periodic System, and Lanthanide series metal oxides and sulfides. Examples of such are copper stannate, tungate oxide, cerium oxide, cobalt tungstate, metal molybdates, metal titanates, metal niobates, and the like.

Additional examples of such compounds are the following oxides: No oxides, e.g., $MnO$, $NiO$, $CoO$, etc.; $M_2O_3$ oxides, e.g., $Cr_2O_3$, $Fe_2O_3$, $Y_2O_3$, $Yb_{2-3}, V_2O_3$, $Ti_2O_3$, $Mn_2O_3$, etc.; $MO_2$ oxides, e.g., $TIO_2$, $MnO_2$, $ThO_2$, $CrO_2$, etc.; $M_3O_4$ oxides, e.g., $Co_3O_4$, $Mn_3O_4$, $Fe_3O_4$, etc.; $MO_3$ oxides, e.g., $CrO_3$, $UO_3$, etc.; $M_2O_2$ oxides, e.g., $V_2O_5$, $Nb_2O_3$, $Ta_2O_3$, etc.; $M_4O_6$ oxides; $M_2O_7$ oxides such as $M_2O_7$; complex oxides-such as those of the formula $XYO_2$ (X and Y being different metals), e.g., $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWO_4$, $NiWO_4$, etc.; $XY_2O_6$, e.g., $CaNb_2O_6$ ("Niobite" oxides); $X_2Y_2O_6$, e.g., $Na_2Nb_2O_6$: Spinel structure oxides, i.e., of the formula $X_2YO_4$, e.g., $Na_2MoO_4$, $NaWO_4$, $Ag_2MoO_4$, $Cu_2MoO_4$, $Li_2MoO_4$, $Li_2WO_4$, $Sr_2TiO_4$, $Ca_24$, etc.; $XY_2O_4$, e.g., $FeCr_2O_4$, $LiZn_2O_4$, etc.; $X_2YO_3$ oxides, e.g., $Fe_2TiO_3$, $Al_2TiO_3$, etc.; and $X_3Y_3O$ (ternary) oxides, e.g., $Mo_3Fe_3O$, $W_3Fe_3O$, $X_3Ti_3O$ (where X is Mn, Fe, Co, etc.). For a discussion of some complex oxides, see Advanced Inorganic Chemistry, Cotten & Wilkinson, p. 51, (1966), Interscience Publishers, Inc., New York and Progress in Inorganic Chem., Vol. 1, 465 (1959) Interscience Publishers, Inc., New York. Also included are nitrades, and the sulfides corresponding to the above oxides. Hydrates of certain metal oxides may also be used, e.g., $WO_3·H_2O$, $WO_3·2H_2O$, $MoO_2·H_2O$ and $MoO_3·2H_2O$. Also included are nitrides, and the sulfides corresponding to the above oxides.

A critical aspect in the present invention is the use of two separate layers of identical electrochromic materials one layer acting as counterelectrode for the other layer. A preferred embodiment consists of tungsten oxide as the electrochromic color electrode and tungsten oxide as the counterelectrode.

The unexpected long service life of the instant device appears to be dependent upon the use if identical electrochromic materials which can undergo similar reversible electrochromic reactions in the presence of a suitable transport medium. Electrochemical compatibility of the electrode reactions in the arrangement of the present invention is unexpected.

While the general mechanism of persistent electrochromism is unknown, the coloration is observed to occur at the negatively charged electrochromic layer. Generally the phenomenon of persistent electrochromism is believed to involve cation transport such as hydrogen or lithium ions to the negative electrode where reduction occurs as a result of a charge compensating electron flow, in a reduction-oxidation system conducting medium.

The medium disposed between and in contact with both electrochromic layers consists of an electrically conductive semi-solid material such as a paste, grease or gel containing some conducting materials. The dispersing medium may be one selected from a group consisting of an electrically conductive paste, grease or gel. A preferred embodiment in the present invention comprises the use of a conductive lithium stearate grease containing dispersed therein propylene carbonate and p-toluene sulfonic acid. The semi-solid medium can contain one or more salts selected from Group IA and IIA alkali or alkaline earth materials. Smaller ions such as lithium and sodium are preferred to larger ions as potassium and rubidium since ionic mobility is a limiting factor. The significant improvement in electrode reversivility and reproducibility and the important advantage of long term stability of operation wer unexpected. This is a significant advantage in applications requiring long term service stability. Thus, alpha numeric character presentation and data display devices, wherein the service requirement is stated in years and/or thousands of cycles, now become commercially feasible.

This invention may be better understood by reference to the drawings in which.

Figure 1:
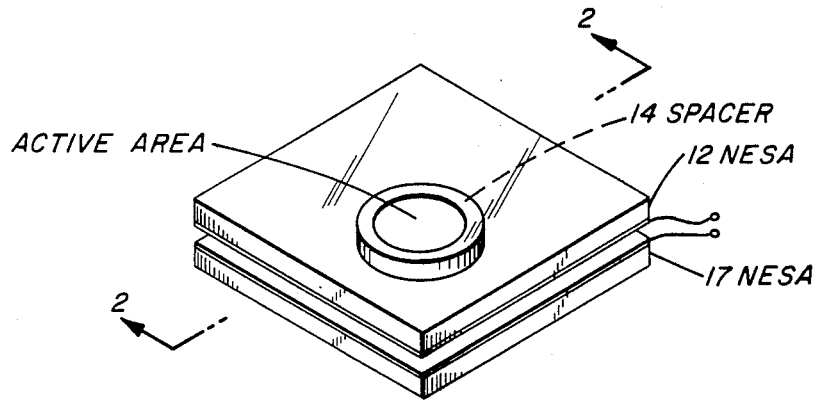
FIG. 1 is a view of an electrochromic device having a coplanar counter electrode.

Turning now to the drawings, FIG. 1 illustrates a plan view of a device of the present invention showing an electrochromicly active center area and the external electrical leads.

Figure 2:
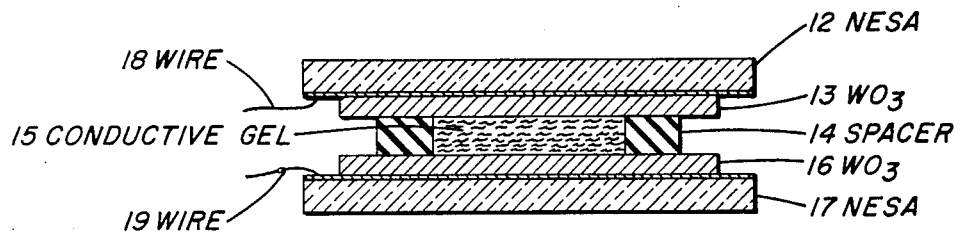
FIG. 2 is a cross-sectional view taken along the lines 2—2 of FIG. 1.

The components of the dandwich device are shown in cross-section view of FIG. 2. The outermost layers 12 and 17 consist of two pieces of transparent substrate containing on their inner surface an electrically conductive coating. The substrate and conductive layer may conveniently be provided as a unit by so called "NESA" glass a commercially available product having a transparent coating of conductive tin oxide on one surface of the glass. Deposed thereon and in contact with each conductive tin oxide layer are separate evaporated films of tungsten oxide 13 and 16 each about 1 micron in thickness. Between and in contact with both tungsten oxide film there is a center portion of an opaque conductive semi-solid about 3 mm in thickness enclosed by a circular insulating spacer 14. Electrical contact of the device to the external potential is accomplished by soldered electrical wire connections from the NESA conductive layers. The electrical pathway through the cell is from one tungsten oxide layer, through the conductive semi-solid electrolyte to the other tungsten oxide layer. Because of the opacity of the conductive medium, the configuration of FIG. 1 permits display of only electrochromic layer 13. Electrochromic layer 16 located behind conductive layer 15 is hidden from view by the opaquety of the conducting medium 15.

Figure 3:
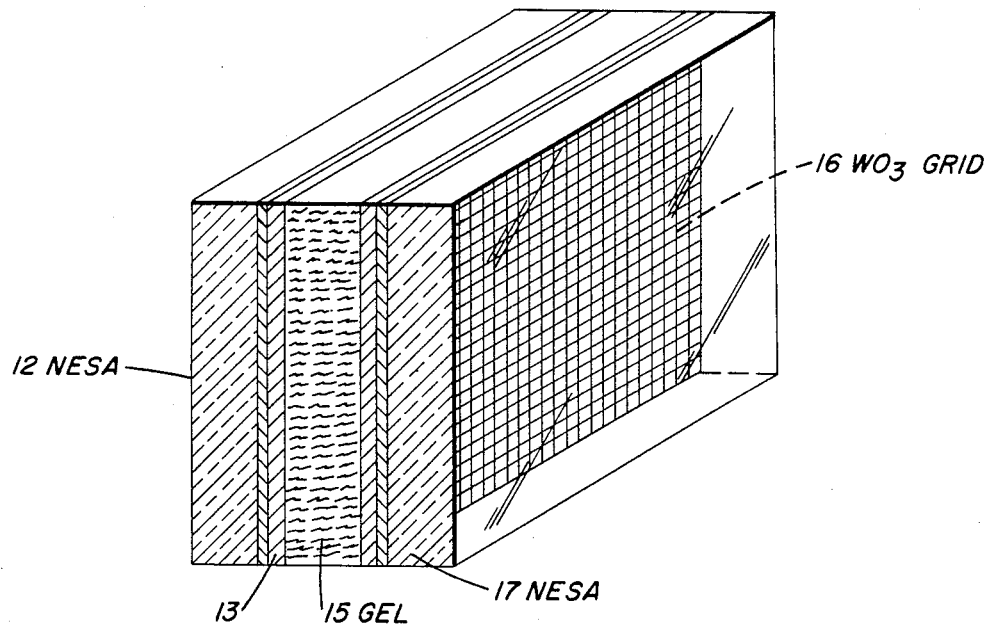
FIG. 3 is a partial cross-sectional view of an electrochromic device having a grid counterelectrode.

FIG. 3 shows the concept of this invention applied to windows wherein one electrochromic layer 16 is fabricated in form of a grid with a high percent transmission even when the material is in the colored state.

Figure 4:
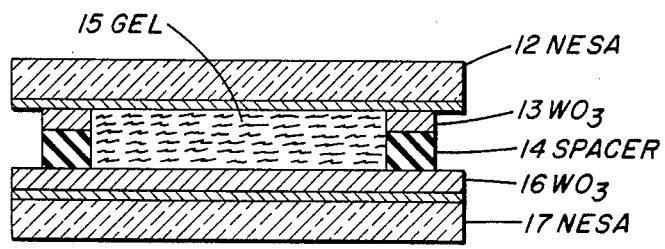
FIG. 4 is a partial cross-sectional view of an electrochromic device wherein the counterelectrode is in the border of the device.

Alternatively FIG. 4 shows an embodiment wherein the electrochromic counterelectrode layer 16 is concealed in the frame of a window so as not to interfere with optical transmission.

The following examples, illustrating particular applications of the present invention are not to be construed as a limitation on the invention except as defined in the appended claims.

EXAMPLE 1

A symmetric electrochromic device was constructed from two NESA glass plates. Each electrochromicly conductive NESA plate was covered with a 1 micron thick evaporated film of tungsten oxide. The glass plates so formed were pressed together with the electrochromic films facing each other but separated by a 2 mm thick sealing ring and spacer which retained an electrolytically conductive grease consisting of lithium stearate-propylene carbonate, 0.1 in p-toluene sulfonic acid. This device was cycled at a constant current of 50 microamperes and potential of 2.5 volts D.C. with half cycles of 4 minutes. The device underwent 3,800 cycles of continuous operations without any observable change in the voltage time curves.

EXAMPLE 2

The procedure of Example 1 was repeated in every detail except for employing a current of 30 microamperes and potential of 1.5 volts D.C. with half cycle of 5 minutes. The device underwent 5,000 cycles of continuous operation.

| Example | Conducting Media | Current (Milliamperes) | Voltage (Volts) | Half Cycle (Sec) | No. Cycles |
|---|---|---|---|---|---|
| 3 | hydrolyzed polyacrylamide | 0.5 | 2.0 | 20 | 50,000 |
| 4 | glycerin-$H_2SO_4$ gel | 0.3 | 2.0 | 30 | 25,000 |
| 5 | ethylene glycol +$H_2SO_4$ gel | 5.0 | 1.5 | 2 | 90,000 |
| 6 | polypropylene carbonate +LiCl +Li stearate grease | .075 | 3.0 | 120 | 7,500 |

We claim:

1. A variable light transmission device which comprises a persistent electrochromic material as a light modulating material, and a pair of electrodes for providing electric current to said material, wherein a persistent electrochromic material is used, as the counterelectrode.

2. A variable light transmission device as in claim 1, which comprises two layers of electrochromic material separated by a semisolid conducting interlayer disposed between a pair of conductive electrodes.

3. The device of claim 2 wherein the electrochromic layers are composed of the same material.

4. The device of claim 2 wherein at least one of the electrodes is substantially transparent.

5. The device of claim 1 wherein at least one of the electrochromic materials is deposited in form of a grid.

6. The device of claim 4 wherein at least one of the electrochromic materials is deposited in the frame of the transparent electrode.

7. The device of claim 2 wherein an electrolytically conducting semisolid layer is employed.

8. A process which comprises subjecting the device of claim 1 to an electric field of alternating polarity whereby coloration and bleach cycles are obtained without change in voltage time characteristics.

9. The device of claim 1 wherein said persistent electrochromic material is tungsten oxide.

* * * * *